(12) United States Patent
Clarke et al.

(10) Patent No.: US 11,148,349 B2
(45) Date of Patent: Oct. 19, 2021

(54) DUAL-SIDED STRUCTURED FILM ARTICLES

(71) Applicant: 3M INNOVATIVE PROPERTIES COMPANY, St. Paul, MN (US)

(72) Inventors: Graham M. Clarke, Woodbury, MN (US); Randy S. Bay, Woodbury, MN (US); Raymond J. Kenney, Woodbury, MN (US); Kurt J. Halverson, Lake Elmo, MN (US); Brent R. Hansen, New Richmond, WI (US); Michael R. Plumb, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 521 days.

(21) Appl. No.: 15/022,474

(22) PCT Filed: Sep. 23, 2014

(86) PCT No.: PCT/US2014/056978
§ 371 (c)(1),
(2) Date: Mar. 16, 2016

(87) PCT Pub. No.: WO2015/048017
PCT Pub. Date: Apr. 2, 2015

(65) Prior Publication Data
US 2016/0229114 A1 Aug. 11, 2016

Related U.S. Application Data

(60) Provisional application No. 61/883,409, filed on Sep. 27, 2013.

(51) Int. Cl.
*B32B 3/30* (2006.01)
*B29C 59/04* (2006.01)
(Continued)

(52) U.S. Cl.
CPC ............ *B29C 59/04* (2013.01); *B29C 43/222* (2013.01); *B29C 48/002* (2019.02); *B29C 48/21* (2019.02);
(Continued)

(58) Field of Classification Search
CPC ....... B29C 59/02; B29C 59/022; B29C 59/04; B29C 59/043; B29C 2059/023;
(Continued)

(56) References Cited

U.S. PATENT DOCUMENTS 3,357,773 A 12/1967 Rowland
3,449,158 A 6/1969 Rowland
(Continued)

FOREIGN PATENT DOCUMENTS

| JP | S45-022038 B | 4/1967 |
| WO | WO 2012-080473 | 6/2012 |
| WO | WO 2015-048017 | 4/2015 |

OTHER PUBLICATIONS

Smith, "Modern Optical Engineering", pp. 104-105, (1966).
International Search Report for PCT International Application No. PCT/US2014/056978, dated Nov. 6, 2014, 3pgs.

*Primary Examiner* — Megha M Gaitonde
(74) *Attorney, Agent, or Firm* — Jeffrey M. Olofeon

(57) ABSTRACT

Film articles with dual-sided structures are ones in which both of the major surfaces of the film have a structured surface. The structured film articles have a first major surface and second major surface, where each surface has a plurality of spaced apart protrusions forming a repeating pattern. Each repeating pattern has a major axis, where the major axis is one of the major axes in the translational direction of the repeating pattern. The major axis of the repeating pattern on the second major surface forms an oblique angle with the major axis on the first major surface, where the angle is in the range of 10-90% of the angle of (Continued)

rotational symmetry of the repeating pattern. The structured film is a unitary substrate. The structured film articles are prepared by providing a flowable material composition having two major surfaces and simultaneously contacting the major surfaces with a first microstructuring tool, and a second microstructuring tool. Each microstructuring tool has a structured surface including a pattern of a plurality of depressions.

14 Claims, 3 Drawing Sheets

(51) Int. Cl.
*B29C 48/00* (2019.01)
*B29C 48/21* (2019.01)
*B29C 43/22* (2006.01)
*B29C 59/02* (2006.01)
*B29L 7/00* (2006.01)

(52) U.S. Cl.
CPC ...... *B29C 59/046* (2013.01); *B29C 2059/023* (2013.01); *B29L 2007/008* (2013.01)

(58) Field of Classification Search
CPC .. B32B 3/26; B32B 3/263; B32B 3/30; Y10T 428/24058; Y10T 428/24074; Y10T 428/24116; Y10T 428/24174; Y10T 428/24355; Y10T 428/24479; Y10T 428/24496; Y10T 428/24504; Y10T 428/24537; Y10T 428/2457; Y10T 428/24587; Y10T 428/24942; Y10T 428/2495
USPC ....... 428/105, 107, 112, 119, 141, 156, 158, 428/159, 163, 167, 169, 212, 213
See application file for complete search history.

(56) References Cited

U.S. PATENT DOCUMENTS

| | | | |
|---|---|---|---|
| 3,542,634 A * | 11/1970 | Such | .................. D04H 1/544 428/135 |
| 3,636,147 A | 1/1972 | Rowland | |
| 3,825,391 A | 7/1974 | Davis | |
| 3,893,795 A | 7/1975 | Nauta | |
| 5,122,902 A | 6/1992 | Benson | |
| 6,106,922 A | 8/2000 | Cejka | |
| 7,165,959 B2 | 1/2007 | Humlicek | |
| 7,484,950 B2 | 2/2009 | Mizunuma | |
| 2010/0188751 A1 | 7/2010 | Clarke | |
| 2011/0076764 A1 | 3/2011 | Rubinsztain | |
| 2012/0051091 A1 | 3/2012 | Landry | |
| 2012/0156772 A1 | 6/2012 | Miller | |
| 2012/0156773 A1 | 6/2012 | Smith | |
| 2012/0156777 A1 | 6/2012 | Rangarajan | |

* cited by examiner

DUAL-SIDED STRUCTURED FILM ARTICLES

CROSS REFERENCE TO RELATED APPLICATIONS

This application is a national stage filing under 35 U.S.C. 371 of PCT/US2014/056978, filed Sep. 23, 2014, which claims the benefit of U.S. Provisional Application No. 61/883,409, filed Sep. 27, 2013, the disclosure of which is incorporated by reference in its/their entirety herein.

FIELD OF THE DISCLOSURE

This disclosure relates generally to film articles with dual-sided structures, and methods for preparing them.

BACKGROUND

A wide range of articles, such as films, sheets and the like have two major surfaces. It is often desirable in the fabrication of such articles to be able to produce a structured surface on both of the major surfaces. Various techniques have been developed for producing a structured surface on both major surfaces of an article.

In U.S. Pat. No. 7,165,959 (Humlicek et al.) an apparatus is described for casting a patterned surface on both sides of a web. The apparatus includes two patterned rolls maintained in continuous registration to within at least 100 microns. Similarly, U.S. Pat. No. 7,484,950 (Mizunuma et al.) describes an alignment device for forming double-surface formed sheets. In this device a first forming roll and a second forming roll are provided parallel and opposite to each other, and control devices are provided that reduce the phase difference between the forming shapes on the two surfaces.

US Patent Publication 2012/0156777 (Rangarajan et al.) describes a carrier for growing adherent cells which comprises one or more outer surfaces and one or more structured indentations on one or more of the outer surfaces.

SUMMARY

Described herein are film articles that are structured substrates with dual-sided structures, and methods for preparing them. Structured substrates with dual-sided structures are ones in which both of the major surfaces of the substrate have a structured surface, generally a microstructured surface.

In some embodiments, the structured substrate comprises a first major surface and second major surface, where the first major surface and the second major surface each comprise a plurality of spaced apart protrusions forming a repeating pattern. Each repeating pattern has a major axis, where the major axis comprises one of the major axes in the translational direction of the repeating pattern. The major axis of the repeating pattern on the second major surface forms an oblique angle with the major axis on the first major surface, where the angle is in the range of 10-90% of the angle of rotational symmetry of the repeating pattern. The structured substrate is a unitary substrate. In some embodiments, the repeating pattern on the first major surface and/or the second major surface comprises a periodic geometric pattern.

Also disclosed herein are methods for preparing structured articles with dual-sided structures. In some embodiments, the method of preparing an article comprises providing a flowable material composition having a first major surface and second major surface, providing a first microstructuring tool, the first microstructuring tool comprising a structured surface comprising a pattern comprising a plurality of depressions, providing a second microstructuring tool, the second microstructuring tool comprising a structured surface comprising a pattern comprising a plurality of depressions, and simultaneously contacting the first microstructuring tool to the first major surface of the flowable material composition and contacting the second microstructuring tool to the second major surface of the flowable material composition to form structured first and second major surfaces on the flowable material composition. The structured first major surface and the structured second major surface each comprise a plurality of spaced apart protrusions forming a repeating pattern, each repeating pattern having a major axis. The major axis comprises one of the major axes in the translational direction of the repeating pattern. The major axis of the repeating pattern on the second major surface forms an oblique angle with the major axis on the first major surface. The angle is in the range of 10-90% of the angle of rotational symmetry of the repeating pattern.

BRIEF DESCRIPTION OF THE DRAWINGS

The present application may be more completely understood in consideration of the following detailed description of various embodiments of the disclosure in connection with the accompanying drawings.

Figure 1:
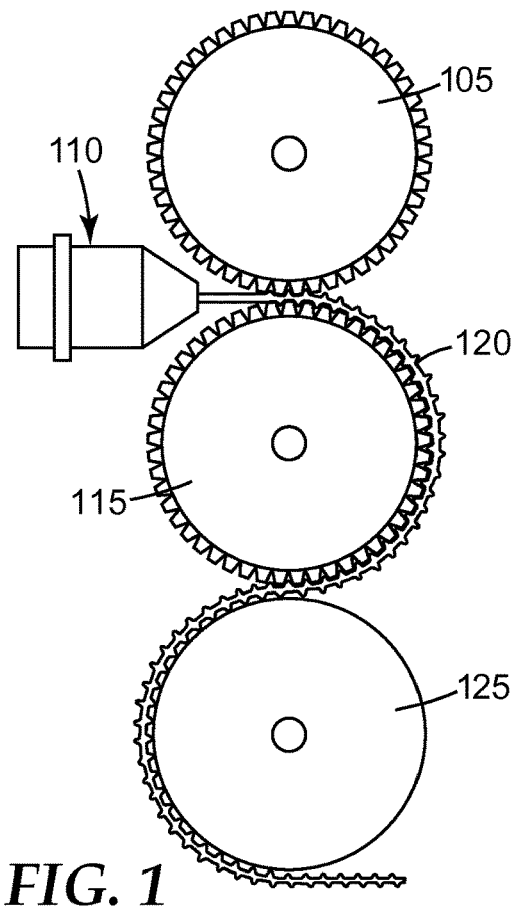
FIG. 1 shows a schematic of a process of this disclosure for forming a dual-sided structured article.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

It is desirable to be able to form articles that have structured surfaces on both major surfaces. Structured surfaces are well understood to be ones that have a pattern imposed on them and are different from the natural surface roughness inherent in all surfaces. A variety of methods are possible and have been used to form articles with structured surfaces on both major surfaces. One method is to prepare two films with structured surfaces on one side and laminate them together to form an article with two structured surfaces. The two films can be laminated together with or without intervening layers or films, to give an article that has at least one interface. Such techniques can be very labor intensive, and generally require considerable care to ensure that the films are aligned properly prior to lamination. Additionally, the presence of one or more interfaces provides potential weak points in the article, points where delamination of the article can occur. Another limitation is that each of the films must be of sufficient thickness to be handled, precluding the formation of thin articles by this technique. Another consideration is that if the materials are bonded together, a bonding agent, such as an adhesive, is necessary to bond the layers together. Not only does this add additional expense and processing steps, the use of, for example a pressure sensitive adhesive, can contain low molecular weight contaminants, such as additives (e.g. tackifying agents or plasticizing agents) or unpolymerized monomers. These low molecular weight contaminants can escape from the edges of the bonded assembly. Additionally, in embodiments where optical properties are important, the bonding materials can adversely affect the optical properties.

Another technique that could be used is to form articles with structuring on both major surfaces is to impart structuring to each surface separately. A flowable material such as a molten film could be first contacted by a first structuring tool on one surface and then be contacted with a second structuring tool on the other surface at a later time. For example, in a continuous process, an extruded film could be contacted with a structuring tool on its top surface and then be contacted by a second structuring tool on its bottom surface as the film passes down the line. There are a number of drawbacks to this process. Structuring at two different times and/or locations requires that the film be maintained in the molten state for a longer period of time. Not only is this undesirable from a cost and energy expenditure standpoint, keeping the film molten after the first structure is imparted can cause that structure to be lost since the molten material can reflow back to its original configuration. In an alternative approach, after the first surface of the film is structured, the film could be cooled to a temperature below the Tg of the film material, and then the second surface could be heated to a temperature at least equal to the Tg of the film material to permit a structure to be imparted to the second surface of the film. However, this approach has similar drawbacks (increased costs required to heat the film twice, high likelihood of changes in the first structure when the film is reheated to impart the second structure, and the like). In particular, the pressure necessary to form the structure on the second surface in such a sequential process may result in damage to the structure on the first surface.

One particularly desirable method for forming structured surfaces on both major surfaces of an article is to simultaneously contact both major surfaces of the article to structuring tools while the article is in the molten and flowable state. In this way, both structured surfaces are formed in a single process.

However, when the structured surface is to include protrusions, this process can become complicated. In order to form protrusions on the structured surface, the structuring tool contains depressions. The flowable material, typically molten material, of the article flows into the depressions of the structuring tool to form the desired surface protrusions. When structures are formed on both major surfaces of the article simultaneously, a large mass of molten material has to flow in two different directions. Depending upon the thickness of the article being structured, when there is significant overlap of patterns, the molten material may not have sufficient volume to flow into both depressions on the structuring tools. This lack of filling of the depression in the tool results in protrusions that are incomplete, that is to say, protrusions that are not as high or wide as they are intended to be. Articles with incomplete protrusions are generally unacceptable.

Another issue with simultaneously imparting identical structures on both sides of a flowable material composition, especially a molten material composition, relates to removing the tools from the molten material composition after patterning. This is particularly problematic when the molten material composition is passed between two structured tool rolls. It has been observed when a single side of a molten material composition is structured, that is to say when the molten material composition is passed between a structured tool roll and a flat tool roll, that the molten material composition, which is cooling during the patterning, prefers to stay in contact with the patterned roll. This is understandable since, because of the patterning, the area of contact between the patterned roll and the cooling molten material is greater than the area of contact between the flat roll and the cooling molten material, and therefore the energy required for the cooling molten material to pull away from the patterned roll is greater than the energy required for the cooling molten material to pull away from the flat roll. However, when identical structures are formed on both sides of the molten material composition, the molten material composition does not have a preference for one tool or the other. In some instances, this can lead to the molten material composition staying in contact with both tools and this can cause defects in the patterned surface such as ridge-like structures formed on the patterned surface.

Another complicating issue resulting from forming film articles that have exactly matching patterns on both surfaces, is the film toughness of such films. When the patterns are matched on both surfaces of the formed film, the overlapping protrusions form a weak point in the film. In downstream processes, such as, for example, slitting of the film, the presence of these weak points enables edge fracture to propagate easily through the structured film article.

These difficulties are observed not only when the structuring is done in a continuous process, such as passing a web of material between two structuring tools, but also in batch processes, such as stamping type operations. This effect is particularly present in the formation of thinner articles. However, it is thinner articles that are desirable in many instances.

It might seem that a simple remedy to the difficulties described above is to offset the tools to form patterns that are not aligned in the down web direction. In other words, both the patterns would be perfectly parallel when viewed in the down web and cross web directions, but when a cross section is viewed in the cross web direction, the protrusions are not aligned. However, such a process is far from simple in practice. For example, when the process is carried out in a continuous fashion with the two patterns imparted by passing the a flowable material, such as a molten material, between two tool rolls, it quickly becomes apparent that such a process is in fact very difficult to implement. With such a scheme, even very small changes in processing conditions can cause the patterns to again overlap, generating all of the difficulties described above. For example, overlapping regions of repeating patterns can be caused by very small diameter differences in the tool rolls. At constant speed, the two patterns will drift in and out of phase (overlap) due to the diameter mismatch. To alleviate this, sophisticated control systems must be employed to prevent pattern overlap. Overlapping patterns can also result from lateral movement of the two rolls relative to each other, again requiring precision design controls to minimize lateral movement in one or both tool rolls. As the size of the patterns decrease, the ability to control relative alignment becomes more and more challenging.

Disclosed herein are articles that are structured on both major surfaces and methods for preparing these articles. The patterns on the different surfaces are offset at an angle, meaning that they are not perfectly aligned. Intentionally misaligning the tool patterns to minimize the overlap of structures reduces the need for stringent process control. The offset patterns are described in greater detail below.

The result of the angled offset patterning methods of this disclosure is that the nature of the patterning, namely that depressions in the two structuring tools do not need to be filled simultaneously at all points in the structure, permits the formation of complete protrusions in both surfaces, and reduces or eliminates the presence of incomplete protrusions. Additionally, the angled offset patterning assists in eliminating defects caused by the flowable material composition sticking to both tools, since the angled offset causes the flowable material composition to prefer one tool over the other tool. Also, since the majority of protrusions on the two structured surfaces are not overlapping, the film toughness issue is also minimized or eliminated.

Figure 2:
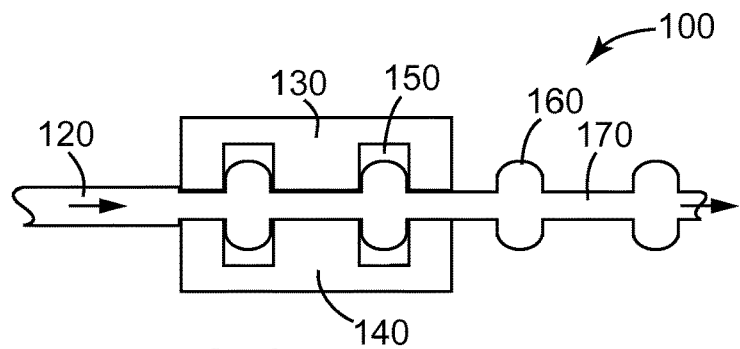
FIG. 2 shows a schematic of a comparative process for forming a dual-sided structured article.
Figure 3:
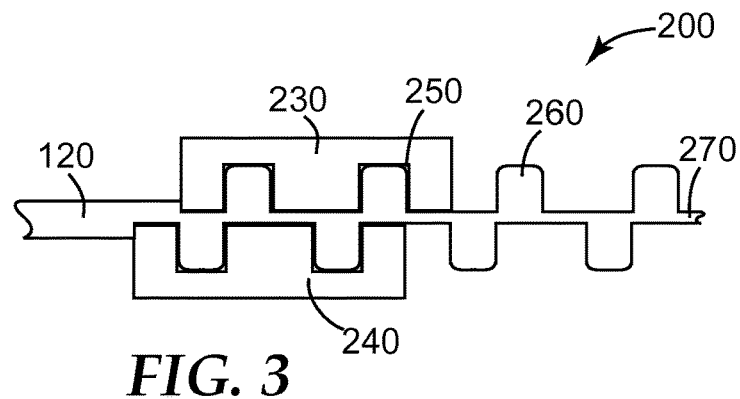
FIG. 3 shows a schematic of a process of this disclosure for forming a dual-sided structured article.

FIGS. 1, 2 and 3 illustrate the two processes described above. FIG. 1 shows an overview of a continuous process to form a film article by simultaneously structuring both sides of a flowable material composition, in particular a molten material composition. FIGS. 2 and 3 show a view of the portion of the process where the two tool structures contact the flowable material composition. FIG. 2 shows a comparative process for forming double sided patterns that are not offset. FIG. 3 shows an embodiment of the process of this disclosure.

In FIG. 1, 110 is an extruder or similar device for supplying a flowable material composition 120. The flowable material composition 120 is carried on first structured tool roll 115 to the point where the flowable material composition contacts second structured tool roll 105, causing the simultaneous microstructuring of flowable material composition 120. Non-structured roll 125 is an optional take-up roll that aids in removing the dual structured film from structured roll 115. In FIG. 2, which illustrates microstructuring process 100, flowable material composition 120 passes between two microstructuring tools, Tool 1 is 130 and corresponds to tool roll 105 in FIG. 1, and Tool 2 is 140 and corresponds to tool roll 115 in FIG. 1. The flowable material composition 120 does not completely fill the depressions in the Tools 130 and 140, rendering a region of incomplete fill, 150. Upon removal of the Tools 130 and 140, the formed dual-structured article comprises incomplete protrusions 160 with land 170 between the protrusions. The thickness between the base of the protrusions and the second major surface in microstructured surfaces is often described as the "land". The height of protrusions is often measured relative to the top surface of the land. While the figure is not drawn to scale, the land between the protrusions 170 is thinner than the flowable material composition 120, since some of the flowable material composition 120 has been formed into the protrusions 160.

In FIG. 3, Process 200 of this disclosure is illustrated. In this process, flowable material composition 120 is simultaneously contacted by two microstructuring tools, Tool 1 is 230 and corresponds to tool roll 105 in FIG. 1, and Tool 2 is 240 and corresponds to tool roll 115 in FIG. 1. The flowable material composition 120 completely fills the depressions in the Tools 230 and 240, filling the region 250, which in FIG. 2 was incompletely filled. Upon removal of the Tools 230 and 240, the formed dual-structured article comprises complete protrusions 260 with land 270 between the protrusions. While the figure is not drawn to scale, the land between the protrusions 270 is thinner than the flowable material composition 120, since some of the flowable material composition 120 has been formed into the protrusions 260. Also, it should be noted that if the flowable material compositions 120 in FIGS. 2 and 3 are the same thickness, the land 270 of FIG. 3 is expected to be thinner than the land 170 of FIG. 2 because protrusions 260 of FIG. 3 are larger (and therefore contain more mass from the flowable material composition 120) than protrusions 160 of FIG. 2. It should also be noted that FIGS. 2 and 3 are generalized to show any type of patterning tools, and if the tools in FIGS. 2 and 3 are tool rolls such as are shown in FIG. 1, the structured film comprising structures 160 or 260 and land 170 or 270 would remain in contact with one of the tool rolls after structuring.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers.

As used herein, the term "ordered arrangement" when used to describe microstructural features, especially a plurality of microstructures, means an imparted pattern different from natural surface roughness or other natural features, where the arrangement can be continuous or discontinuous, can be a repeating pattern, a non-repeating pattern, etc.

As used herein, the term "microstructure" means the configuration of features wherein at least 2 dimensions of the features are microscopic. The topical and/or cross sectional view of the features must be microscopic.

As used herein, the term "microscopic" refers to features of small enough dimension so as to require an optic aid to the naked eye when viewed from any plane of view to determine its shape. One criterion is found in Modern Optic Engineering by W. J. Smith, McGraw-Hill, 1966, pages 104-105 whereby visual acuity, " . . . is defined and measured in terms of the angular size of the smallest character that can be recognized." Normal visual acuity is considered to be when the smallest recognizable letter subtends an angular height of 5 minutes of arc on the retina.

At a typical working distance of 250 mm (10 inches), this yields a lateral dimension of 0.36 mm (0.0145 inch) for this object.

The term "adjacent" as used herein when referring to two layers means that the two layers are in proximity with one another with no intervening open space between them. They may be in direct contact with one another (e.g. laminated together) or there may be intervening layers.

As used herein, the term "unitary" when used to describe a substrate or film means that the substrate or film that has been prepared in single step. The unitary substrates or films may be prepared from a single material or multiple materials. Unitary substrates or films may be prepared as a monolithic substrate or film (such as extrusion, for example) or it may be prepared as a multi-layer substrate or film (such as by co-extrusion, for example).

As used herein the term "thermoplastic", refers to the property of a polymeric material. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs.

As used herein, the term "major axis" refers to an axis of translational symmetry present in a pattern of regular shapes. A pattern of shapes exhibits translational symmetry if displacement in a direction-horizontal or vertical displacement for example—returns the shape to essentially its original configuration. For instance, in a square pattern there are two major axes of translational symmetry, one in the x direction and one in the y direction. In a hexagonally packed array, there are three major axes of translation symmetry.

Disclosed herein are methods for preparing articles with two microstructured surfaces. These methods comprise providing a flowable material composition comprising a first major surface and second major surface, providing a first microstructuring tool, the first microstructuring tool comprising a structured surface comprising a pattern comprising a plurality of depressions, providing a second microstructuring tool, the second microstructuring tool comprising a structured surface comprising a pattern comprising a plurality of depressions, and simultaneously contacting the first microstructuring tool to the first major surface of the flowable material composition and contacting the second microstructuring tool to the second major surface of the flowable material composition to form structured first and second major surfaces on the flowable material composition. While, depending upon the configurations of the two structuring tools, the two structuring tools may not contact the flowable composition at exactly the same instant, it is typical that they contact the flowable composition at substantially the same time, and the term "simultaneously" is meant to convey this concept and also that the two tools are in contact with the flowable composition at the same time.

The structured first and second major surfaces are formed such that each comprise a plurality of spaced apart protrusions forming a repeating pattern, each repeating pattern having a major axis, wherein the major axis comprises one of the major axes in the translational direction of the repeating pattern, and wherein the major axis of the repeating pattern on the second major surface forms an oblique angle with the major axis on the first major surface, wherein the angle is in the range of 10-90% of the angle of rotational symmetry of the repeating pattern. In some embodiments, the angle is the range of 20-80% of the angle of rotational symmetry of the repeating pattern. In some embodiments, the repeating pattern comprises a repeating square pattern and the angle between the major axis on the repeating pattern on the first major surface and the major axis on the repeating pattern on the second major surface is in the range of 20-70°.

Typically, the flowable material composition comprises a unitary film, sometimes called a unitary substrate. A unitary film is one which may comprise a single material or it may comprise multiple materials, but the unitary film is one that is formed in a single step. In some embodiments, the unitary film comprises a monolithic construction. By this it is meant that the unitary film is formed of a single material, frequently by a process such as extrusion. In these embodiments, the flowable material composition typically is the output of an extruder. In other embodiments, the unitary film may comprise a blend of materials. In other embodiments, the unitary film comprises a multi-layer construction, even though the unitary film is prepared in a single step. Thus, formation of a multi-layer film or substrate by lamination of individual film layers typically does not provide a unitary film or substrate. In embodiments of this disclosure, the flowable material composition typically is the output of extrusion or co-extrusion and the extruded or co-extruded layers may comprise a single material or may be a blend of materials.

A wide range of materials are suitable for use as the flowable material composition. Typically these materials are thermoplastic polymeric materials. Examples of useful thermoplastic polymeric materials include polyvinyl chloride, polysulfones, polyalkylenes such as polyethylene, polypropylene and polybutylene, polyesters such as PET (polyethylene terephthalate), copolyesters such as PETG, polycarbonates, poly(meth)acrylates such as PMMA (polymethyl methacrylate), nylons, TPOs (thermoplastic polyolefin blends), polyurethanes including TPU (thermoplastic polyurethane materials), polystyrenes, impact-modified polystyrenes, and the like. Particularly suitable materials include polypropylene, polystyrenes, and impact-modified polystyrenes.

As mentioned above, the flowable material composition is, in many embodiments, a unitary film. This unitary film can be prepared by extrusion, either extrusion of a single layer or co-extrusion of multiple layers. Typically this unitary film has a thickness of 25-203 micrometers (1-8 mils). When the thickness of the unitary film includes the height of the structures the thickness can be even larger, from 25-1,016 micrometers (1-40 mils).

Both major surfaces of the flowable material composition are simultaneously contacted by microstructuring tools. Microstructuring tools are well understood by one of skill in the art to impart a structure to a surface when contacted to a structurable surface under the conditions of heat and pressure. In this disclosure, the major surfaces of the flowable material composition are structurable surfaces, and upon release of the microstructuring tool, the surfaces of the flowable material composition are structured surfaces. The structure on the structured surface is the inverse of the structure on the tool surface, that is to say a protrusion on the tool surface will form a depression on the structured surface, and a depression on the tool surface will form a protrusion on the structured surface. The microstructural features may assume a variety of shapes, but at least some of the microstructural features on the microstructuring tools are depressions.

Typically, the microstructuring tool is a molding tool. Structured molding tools can be in the form of a planar stamping press, a flexible or inflexible belt, or a roller. Furthermore, molding tools are generally considered to be tools from which the microstructured pattern is generated in the surface by embossing, coating, casting, or platen pressing and do not become part of the finished article.

A broad range of methods are known to those skilled in this art for generating microstructured molding tools. Examples of these methods include but are not limited to photolithography, etching, discharge machining, ion milling, micromachining, and electroforming. Microstructured molding tools can also be prepared by replicating various microstructured surfaces, including irregular shapes and patterns, with a moldable material such as those selected from the group consisting of crosslinkable liquid silicone rubber, radiation curable urethanes, etc. or replicating various microstructures by electroforming to generate a negative or positive replica intermediate or final embossing tool mold. Also, microstructured molds having random and irregular shapes and patterns can be generated by chemical etching, sandblasting, shot peening or sinking discrete structured particles in a moldable material. Additionally any of the microstructured molding tools can be altered or modified according to the procedure taught in U.S. Pat. No. 5,122,902 (Benson). The tools may be prepared from a wide range of materials including metals such as nickel, copper, steel, or metal alloys, or polymeric materials.

A variety of patterns may be present in the structured surface of the microstructuring tools. In articles with dual sided arrays of structures such as are generated by the methods described in this disclosure, it is often desirable for the patterns of the structures to be the same. In this way, both sides of the film can be used for the same purpose. However, as described above, it can be undesirable to form identical protrusion structures in both major surfaces simultaneously, because the flowable material composition may not be able to completely form both sets of protrusions simultaneously, and this can lead to the formation of incomplete structural features. In this disclosure, the patterns of structures are angularly offset, meaning that they are not perfectly aligned. In this way, even if the patterns of structures have the same sizes and shapes, because they are offset, the problems with forming sets of protrusions over large contiguous portions of the surface area on both major surfaces of the flowable material composition simultaneously are avoided. In the case of tools that are rolls forming a nip, as the tool rolls change relative position during processing, the in phase and out of phase overlap is minimized.

There are several ways in which the offset patterns can be described. In general, the patterns can be described by the major axes of the patterns. In this description, the structured first and second major surfaces comprise a plurality of spaced apart protrusions forming a repeating pattern, each repeating pattern having a major axis, wherein the major axis comprises one of the major axes in the translational direction of the repeating pattern, and wherein the major axis of the repeating pattern on the second major surface forms an oblique angle with the major axis on the first major surface, wherein the angle is in the range of 10-90% of the angle of rotational symmetry of the repeating pattern. In some embodiments, the angle is the range of 20-80% of the angle of rotational symmetry of the repeating pattern. An example of such a pattern is a repeating square pattern. In this example, the angle of rotational symmetry is 90°, and the offset angle is thus in the range of 9-81°, or 18-72°. The particular angle chosen depends not only on the specific design of the pattern, but also on a variety of other factors. For example, in the square pattern designs shown in FIG. 6, the width and depth of each protrusion that forms the pattern are also factors to be considered when the offset angle is established. In some embodiments, the repeating pattern comprises a repeating square pattern and the angle between the major axis on the repeating pattern on the first major surface and the major axis on the repeating pattern on the second major surface is in the range of 20-70°.

Another way to describe the offset pattern, one that can be used to describe many embodiments, is one in which the protrusions formed in the major surfaces of the flowable material composition form ridges. For example, where each of the first and second structured surfaces comprises a plurality of parallel spaced apart ridges extending along a first direction intersecting a plurality of parallel spaced apart ridges extending along a second direction perpendicular to the first direction to form an array of cavities, each cavity being defined by four walls, the walls of the cavities on the first and second structured surfaces having a same height and width. The first direction in the first structured surface forms an oblique angle in the range of 20° to 70° with the first direction of the second structured surface.

Yet another way of describing the offset patterns is to consider a cross section of the formed unitary film article, particularly a cross section taken along the first direction as described above. The cross section comprises a plurality of discrete spaced apart structures on the first major surface (first structures) and a plurality of discrete spaced apart structures in the second major surface (second structures). At least one of the first structures fully overlaps a second structure, and at least one first structure does not fully overlap a second structure. This is in contrast to the situation where the structures were not offset, where all of the top and bottom structures would completely overlap.

In some embodiments, it may be desirable that the protrusions formed in the first and second structured surfaces are not ridges. In these embodiments, the offset patterns may be described as comprising opposing first and second major surfaces, each of the first and second major surfaces comprising a regular two-dimensional array of substantially identical discrete spaced apart protruding structures forming rows of protruding structures extending along a first direction and columns of protruding structures extending along a second direction perpendicular to the first direction, the protruding structures in the top and bottom surfaces being substantially identical. In these embodiments, the first direction in the first structured surface forms an oblique angle in the range of 20° to 70° with the first direction of the second structured surface.

Typically, the protrusions of the structured first and second surfaces are arranged to form an array of cavities. In some embodiments, the array of cavities comprises a square array of cavities. The cavities can also comprise a variety of other shapes, such as hexagons, triangles, and circles. The cavities can be described as having walls formed by the protrusions and bottoms formed by the land area between the formed protrusions. (The land that forms the cavity bottoms has been described above relative to FIGS. 2 and 3.) One advantage of the methods of the present disclosure is that the land between protrusions can be relatively thin. Typically, this thickness is 5-200 micrometers, 5-100 micrometers, or even 10-50 micrometers. It is desirable that the land between protrusions be relatively thin because it permits the entire article to be relatively thin and this permits the dual sided structural articles to be prepared from less material and thus be less expensive. Additionally, having thin land thicknesses can help the optical clarity, which is desirable if the dual-sided structured films are used, for example, in DNA microtest wells, and can aid in the processing of the films, such as, for example, the making of through-film perforations by post-structuring flame treating to form filtration media.

Figure 4:
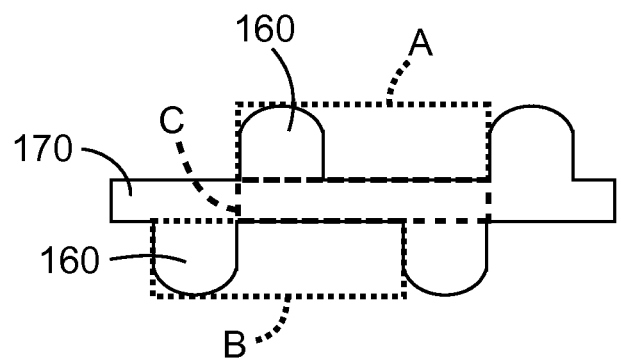
FIG. 4 shows a cross sectional view of a portion of dual-sided structured article of this disclosure.

Another way to describe the relative thinness of the cavity bottoms is illustrated in FIG. 4. In this figure, a cross section of an article of this disclosure is shown. In this cross section, protrusions 160 as well as land 170 are shown. Protrusions 160 and the cavity that it defines are shown as Area A and Area B. This combined surface area is compared to the area of the land which is Area C. Thus the ratio of the sums of Areas A and B to the Area C is greater than 1:1. In some embodiments the ratio of the sums of Areas A and B to the Area C is in the range of 1:1 to 20:1.

Typically the heights of the protrusions on the first and second structured major surfaces are typically much greater than the land thickness. Additionally, when the structured substrate is viewed in a cross section, the cross section of a ridge will have a cross sectional area (a first cross sectional area). When this first cross sectional area is compared to the cross sectional area of the land beneath the ridge, the ratio of the first cross sectional area to the land cross sectional area is at least one.

Also disclosed herein are articles with microstructures on both major surfaces, called structured substrates. These articles are unitary articles and can be formed by the methods described above. As described above, the microstructured patterns on the first major surface is offset from the microstructured pattern of the second major surface.

In some embodiments, the article comprises a unitary substrate with opposing first and second major surfaces, each of the first and second major surfaces comprising a plurality of parallel spaced apart protrusions forming a repeating pattern, each repeating pattern having a major axis, wherein the major axis comprises one of the major axes in the translational direction of the repeating pattern, and wherein the major axis of the repeating pattern on the second major surface forms an oblique angle with the major axis on the first major surface, wherein the angle is in the range of 10-90% of the angle of rotational symmetry of the repeating pattern, and wherein the structured substrate is a unitary substrate. In some embodiments, the angle is the range of 20-80% of the angle of rotational symmetry of the repeating pattern.

In some embodiments, the repeating pattern on the first major surface and/or the second major surface comprise a periodic geometric pattern. A wide variety of periodic geometric patterns are suitable. Examples of suitable periodic geometric patterns include a pattern of squares, a pattern of hexagons, a pattern of triangles, or a pattern of circles. These geometric patterns form an array of cavities in the structured surface. Therefore, such arrays include arrays of square cavities, hexagonal cavities, triangular cavities, or circular cavities. In some embodiments, the repeating pattern comprises a repeating square pattern and the angle between the major axis on the repeating pattern on the first major surface and the major axis on the repeating pattern on the second major surface is in the range of 20-70°.

The cavities can be described as having walls formed by the protrusions and bottoms formed by the land area between the formed protrusions. (The land that forms the cavity bottoms has been described above relative to FIGS. 2 and 3.) One advantage of the methods of the present disclosure is that the land between protrusions can be relatively thin. Typically, this thickness is 5-200 micrometers, 5-100 micrometers, or even 10-50 micrometers. It is desirable that the land between protrusions be relatively thin because it permits the entire article to be relatively thin and this permits the dual sided structural articles to be prepared from less material and thus be less expensive. Additionally, having thin land thicknesses can help the optical clarity, which is desirable if the dual-sided structured films are used, for example, in DNA microtest wells, and can aid in the processing of the films, such as, for example, the making of through-film perforations by post-structuring flame treating to form filtration media.

Another way to describe the relative thinness of the cavity bottoms is illustrated in FIG. 4. In this figure, a cross section of an article of this disclosure is shown. In this cross section, protrusions 160 as well as land 170 are shown. Protrusions 160 and the cavity that it defines are shown as Area A and Area B. This combined surface area is compared to the area of the land which is Area C. Thus the ratio of the sums of Areas A and B to the Area C is greater than 1:1. In some embodiments the ratio of the sums of Areas A and B to the Area C is in the range of 1:1 to 20:1.

Typically the heights of the protrusions on the first and second structured major surfaces are typically much greater than the land thickness. Additionally, when the structured substrate is viewed in a cross section, the cross section of a ridge will have a cross sectional area (a first cross sectional area). When this first cross sectional area is compared to the cross sectional area of the land beneath the ridge, the ratio of the first cross sectional area to the land cross sectional area is at least one.

Figure 5:
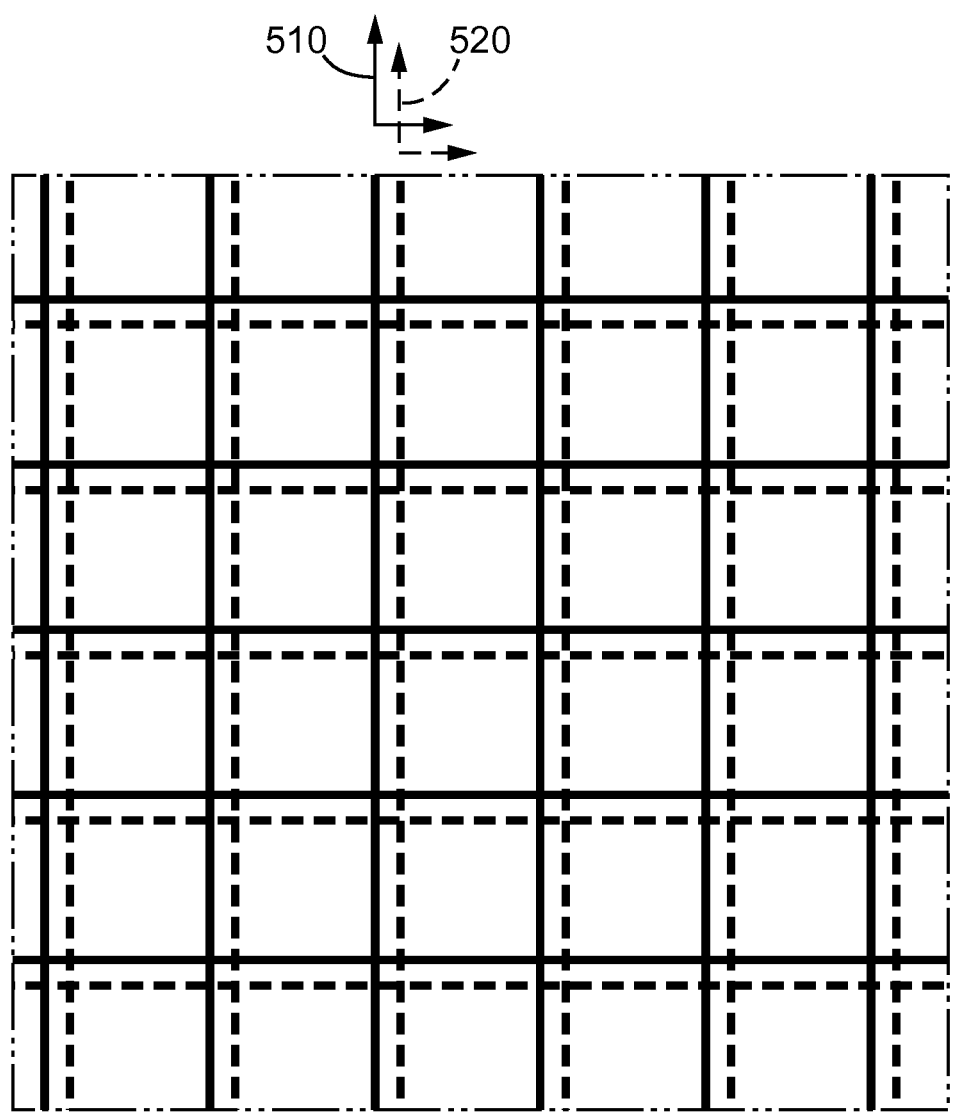
FIG. 5 shows a perspective view of a comparative dual-sided structured article.
Figure 6:
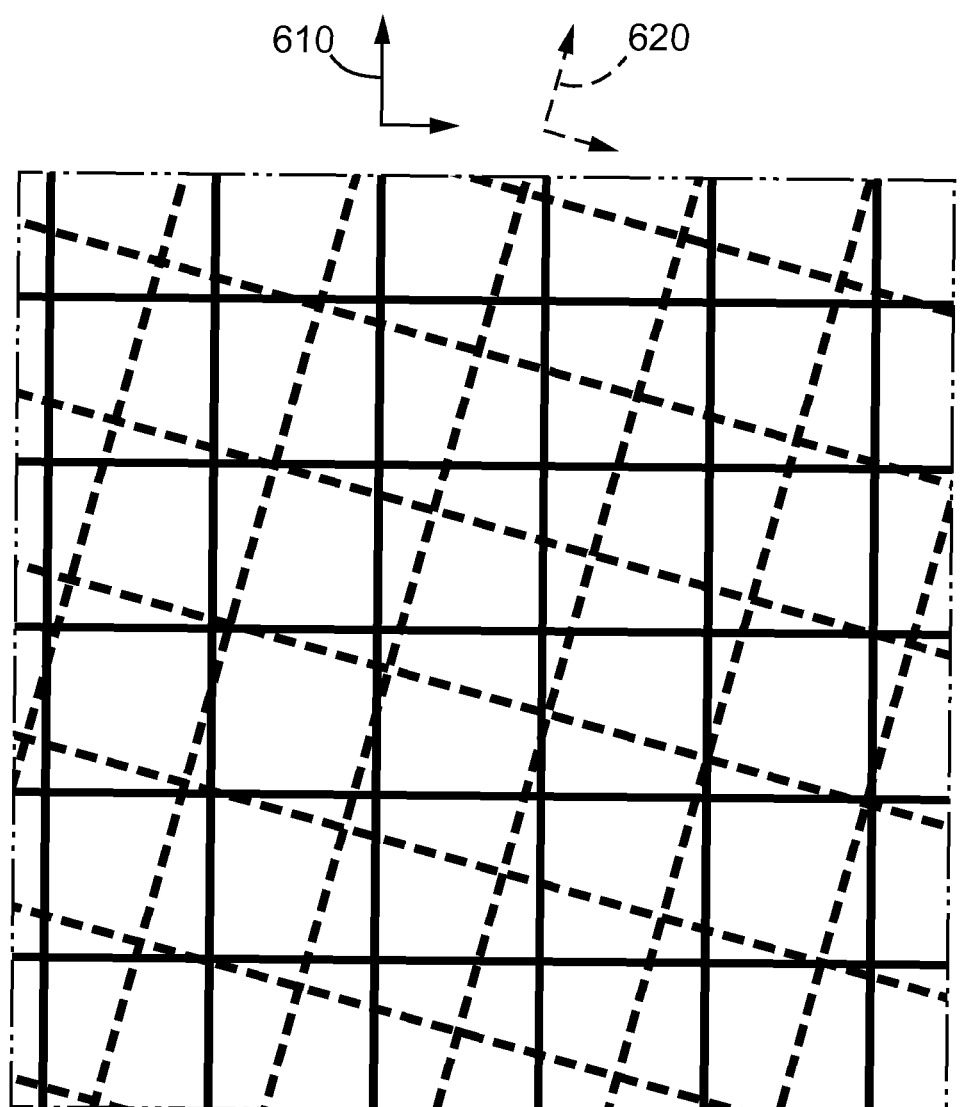
FIG. 6 shows a perspective view of a dual-sided structured article of this disclosure.

The offset of the patterns of the first and second structured surfaces is an angular offset, not a lateral or longitudinal offset. This is shown in FIGS. 5 and 6. FIG. 5 is a comparative dual structured substrate. In FIG. 5 the solid lines describe the pattern in the first major surface and the dashed lines describe the pattern in the second major surface. The major axis for the solid line pattern is shown as 510, and the major axis for the dashed line pattern is shown as 520. The patterns are offset but only in the lateral direction. It is clear that there is no angular offset because the angular offset angle as described by 510 and 520 is 0°. These patterns can be described as angularly aligned instead of angularly offset as are the patterns of this disclosure.

FIG. 6 shows a dual structured substrate of this disclosure. In FIG. 6 the solid lines describe the pattern in the first major surface and the dashed lines describe the pattern in the second major surface. The major axis for the solid line pattern is shown as 610, and the major axis for the dashed line pattern is shown as 620. The patterns are angularly offset because the angular offset angle as described by 610 and 620 is greater than 0° but less than 90°.

EXAMPLES

A series of computer modeling studies were carried out to model arrays of regular structures at differing angular offsets for dual-sided microstructured substrates.

Example 1

Modeling of a Square Array Pattern

The computer modeling software package Blender (available from http://www.blender.org) was used to create a two dimensional representation of the protrusions on the substrate.

The pattern on one side of the substrate was represented by a mesh of 64×64 close-packed array of squares each with an outside side length of 1 Unit and a side thickness or width, W, of 0.05 Units. This tiled array with a repeat distance or pitch, P, of 1 Unit, when viewed perpendicular to the plane of the array looks like an array of horizontal and vertical rectangles. The pattern on the second side of the substrate was an identical array duplicated from the first. This second mesh object was superimposed on top of the first array with zero offset in either translation or rotation.

Both the arrays were given a color, in this case red (RGB 255,0,0) and a transparency (alpha) value of 50%, such that when rendered using the internal Blender Renderer with suitable settings there was a quantifiable difference in the brightness value of the image between areas where there was and was not overlap of the two patterns.

A virtual orthogonal camera was positioned perpendicular to the plane of the rectangles such that the rendered image covered an area with a width and height equal to 40 Units. The image was centered on the center of the intersection the edges connecting four neighboring squares at the center of one of the arrays. The rendered image was saved in the Microsoft bitmap format, 24 bits per pixel, 72 dpi and at a size of 1600×1600 pixels.

To evaluate the proportion of overlap of the two arrays, one of the arrays was translated in a grid-like fashion in steps of 0.05 Units in both the X- and Y-directions to a maximum offset of 0.95 Units in both the X- and Y-directions to cover one "unit cell" area, i.e. 400 unique positions. For each offset position a rendered image was saved as described above and then opened in the image analysis software package ImageJ (available from http://rsbweb.nih.gov/ij/). The Histogram function was used to generate 256 level histogram data from the image. For the conditions used above, the overlapped and non-overlapped areas of the image had values of 75 and 63 respectively. This tabulated histogram data was recorded.

After all 400 positions had been recorded, the translation offset was reset to zero and the rotation of one array modified and the generating and recording of the data for each of the 400 translation offset positions was repeated. This process was completed for rotation offsets of 0, 1, 2, 3, 4, 5, 10, 15, 20, 25, 30, 35, 40, and 45 degrees. The center of rotation was located at the center of the intersection the edges connecting four neighboring squares.

Table 1 below shows the results of the analysis. The maximum possible overlap occurred when the patterns are fully aligned at zero degrees rotational offset and zero positional offset. The first column shows the degrees of angular offset of one pattern relative to the other. The second column shows the average overlap of all possible translational offset positions in proportion to the maximum possible overlap. The second and third columns show the smallest and largest value of overlap over all possible translational offset positions in proportion to the maximum possible overlap. The fifth column shows the difference of columns three and four. Values for angle offsets of between 45 and 90° are inferred by symmetry.

TABLE 1

| Offset Angle (Degrees) | Average % of maximum possible overlap | Minimum % of maximum possible overlap | Maximum % of maximum possible overlap | Range of Overlap % |
|---|---|---|---|---|
| 0 | 38.7% | 22.2% | 100.0% | 77.8% |
| 1 | 36.3% | 23.4% | 42.3% | 18.9% |
| 2 | 35.8% | 32.0% | 42.2% | 10.2% |
| 3 | 36.1% | 35.3% | 38.2% | 2.9% |
| 4 | 36.0% | 33.3% | 37.1% | 3.8% |
| 5 | 35.9% | 34.0% | 38.1% | 4.1% |
| 10 | 36.0% | 35.9% | 36.1% | 0.2% |

TABLE 1-continued

| Offset Angle (Degrees) | Average % of maximum possible overlap | Minimum % of maximum possible overlap | Maximum % of maximum possible overlap | Range of Overlap % |
|---|---|---|---|---|
| 15 | 36.0% | 35.9% | 36.2% | 0.3% |
| 20 | 36.0% | 35.9% | 36.1% | 0.1% |
| 25 | 36.0% | 36.0% | 36.0% | 0.1% |
| 30 | 36.0% | 35.9% | 36.1% | 0.3% |
| 35 | 36.0% | 36.0% | 36.0% | 0.0% |
| 40 | 36.0% | 36.0% | 36.0% | 0.0% |
| 45 | 35.9% | 35.9% | 35.9% | 0.0% |
| 50 | 36.0% | 36.0% | 36.0% | 0.0% |
| 55 | 36.0% | 36.0% | 36.0% | 0.0% |
| 60 | 36.0% | 35.9% | 36.1% | 0.3% |
| 65 | 36.0% | 36.0% | 36.0% | 0.1% |
| 70 | 36.0% | 35.9% | 36.1% | 0.1% |
| 75 | 36.0% | 35.9% | 36.2% | 0.3% |
| 80 | 36.0% | 35.9% | 36.1% | 0.2% |
| 85 | 35.9% | 34.0% | 38.1% | 4.1% |
| 86 | 36.0% | 33.3% | 37.1% | 3.8% |
| 87 | 36.1% | 35.3% | 38.2% | 2.9% |
| 88 | 35.8% | 32.0% | 42.2% | 10.2% |
| 89 | 36.3% | 23.4% | 42.3% | 18.9% |
| 90 | 38.7% | 22.2% | 100.0% | 77.8% |

Example 2

Modeling of a Triangular Array Pattern

The same procedures as Example 1 were followed except for the following changes. The two identical arrays consisted of triangles with an outside edge length of 1 Unit, an edge width, W, of 0.028875 Units in a close-packed array with one of the edges of the triangles in the X-direction. In this case one of the arrays was translated by 0.05 Units in the X-direction to a maximum of 1.5 Units, and 0.050943 Units in the Y-Direction to a maximum of 0.815088 Units.

Rotation angles of 0, 1, 2, 3, 4, 5, 10, 15, 20, 25 and 30 degrees were evaluated. The center of rotation was located at the center of the intersection the edges connecting six neighboring triangles.

The data are presented in Table 2 below, in the same manner as for the data described in Example 1. Values for angle offsets of between 30 and 60° are inferred by symmetry.

TABLE 2

| Offset Angle (Degrees) | Average % of maximum possible overlap | Minimum % of maximum possible overlap | Maximum % of maximum possible overlap | Range of Overlap % |
|---|---|---|---|---|
| 0 | 37.2% | 28.1% | 100.0% | 71.9% |
| 1 | 36.0% | 33.3% | 38.5% | 5.2% |
| 2 | 36.0% | 34.6% | 36.9% | 2.4% |
| 3 | 36.0% | 35.5% | 36.8% | 1.2% |
| 4 | 36.0% | 35.7% | 36.6% | 1.0% |
| 5 | 36.0% | 35.9% | 36.1% | 0.2% |
| 10 | 36.0% | 36.0% | 36.1% | 0.1% |
| 15 | 35.9% | 35.3% | 36.7% | 1.5% |
| 20 | 36.0% | 36.0% | 36.0% | 0.1% |
| 25 | 36.0% | 36.0% | 36.0% | 0.1% |
| 30 | 36.0% | 35.8% | 36.2% | 0.4% |
| 35 | 36.0% | 36.0% | 36.0% | 0.1% |
| 40 | 36.0% | 36.0% | 36.0% | 0.1% |
| 45 | 35.9% | 35.3% | 36.7% | 1.5% |
| 50 | 36.0% | 36.0% | 36.1% | 0.1% |
| 55 | 36.0% | 35.9% | 36.1% | 0.2% |
| 56 | 36.0% | 35.7% | 36.6% | 1.0% |
| 57 | 36.0% | 35.5% | 36.8% | 1.2% |

TABLE 2-continued

| Offset Angle (Degrees) | Average % of maximum possible overlap | Minimum % of maximum possible overlap | Maximum % of maximum possible overlap | Range of Overlap % |
|---|---|---|---|---|
| 58 | 36.0% | 34.6% | 36.9% | 2.4% |
| 59 | 36.0% | 33.3% | 38.5% | 5.2% |
| 60 | 37.2% | 28.1% | 100.0% | 71.9% |

Example 3

Modeling of a Hexagonal Array Pattern

The same procedures as Example 1 were followed except for the following changes. The two identical arrays consisted of hexagons with the smallest diameter of the outside edge of the Hexagon of 1 Unit, an edge width, W, of 0.05 Units, and a in a hexagonal close-packed array with the orientation of the smallest diameter in the X-direction. In this case one of the arrays was translated by 0.05 Units in the X-direction to a maximum of 1.5 Units, and 0.050943 Units in the Y-Direction to a maximum of 0.815088 Units. This defined a unit cell of the pattern.

Rotation angles of 0, 1, 2, 3, 4, 5, 10, 15, 20, 25, 30, 35, 40, 45, 50, 55 and 60 degrees were evaluated. The center of rotation was located at the center of the intersection of the edges connecting three neighboring hexagons.

The data are presented in Table 3 below, in the same manner as for the data described in Example 1. Values for angle offsets of between 30 and 60° are inferred by symmetry.

TABLE 3

| Offset Angle (Degrees) | Average % of maximum possible overlap | Minimum % of maximum possible overlap | Maximum % of maximum possible overlap | Range of Overlap % |
|---|---|---|---|---|
| 0 | 36.8% | 22.2% | 100.0% | 77.8% |
| 1 | 36.0% | 31.6% | 42.2% | 10.6% |
| 2 | 35.9% | 33.0% | 38.0% | 5.0% |
| 3 | 36.0% | 34.7% | 37.7% | 2.9% |
| 4 | 36.0% | 35.1% | 36.9% | 1.7% |
| 5 | 36.0% | 35.8% | 36.1% | 0.4% |
| 10 | 36.0% | 35.9% | 36.1% | 0.2% |
| 15 | 36.0% | 35.9% | 36.0% | 0.1% |
| 20 | 36.0% | 35.9% | 36.1% | 0.1% |
| 25 | 36.0% | 35.9% | 36.1% | 0.2% |
| 30 | 36.0% | 35.8% | 36.3% | 0.4% |
| 35 | 36.0% | 35.9% | 36.1% | 0.2% |
| 40 | 36.0% | 35.9% | 36.1% | 0.1% |
| 45 | 36.0% | 35.9% | 36.0% | 0.1% |
| 50 | 36.0% | 35.9% | 36.1% | 0.2% |
| 55 | 36.0% | 35.8% | 36.1% | 0.4% |
| 56 | 36.0% | 35.1% | 36.9% | 1.7% |
| 57 | 36.0% | 34.7% | 37.7% | 2.9% |
| 58 | 35.9% | 33.0% | 38.0% | 5.0% |
| 59 | 36.0% | 31.6% | 42.2% | 10.6% |
| 60 | 36.8% | 22.2% | 100.0% | 77.8% |

What is claimed is:

1. A structured substrate comprising:
a first major surface and second major surface, wherein the first major surface and the second major surface each comprise a plurality of spaced apart protrusions forming a repeating pattern, each repeating pattern having a major axis, wherein the major axis comprises one of the major axes in the translational direction of the repeating pattern, and wherein the major axis of the repeating pattern on the second major surface forms an oblique angle with the major axis on the first major surface, wherein the angle is in the range of 10-90% of the angle of rotational symmetry of the repeating pattern, and wherein the structured substrate is a monolithic substrate prepared in a single step in a continuous process.

2. The structured substrate of claim 1, wherein the repeating pattern on the first major surface and/or the second major surface comprise any periodic geometric pattern.

3. The structured substrate of claim 2, wherein the periodic geometric pattern comprises a pattern of squares, a pattern of hexagons, a pattern of triangles, or a pattern of circles.

4. The structured substrate of claim 1, wherein the repeating pattern on the first major surface is the same as the repeating pattern on the second major surface.

5. The structured substrate of claim 1, wherein the repeating pattern on the first major surface is different from the repeating pattern on the second major surface.

6. The structured substrate of claim 1, wherein the angle is in the range of 20-80% of the angle of rotational symmetry of the repeating pattern.

7. The structured substrate of claim 1, wherein the repeating pattern on the first major surface and the repeating pattern on the second major surface form an array of cavities, and wherein the protrusions form the walls of the cavities.

8. The structured substrate of claim 7, wherein the array of cavities comprises an array of square cavities.

9. The structured substrate of claim 7, wherein the array of cavities comprises an array of hexagonal cavities.

10. The structured substrate of claim 7, wherein the array of cavities comprises an array of triangular cavities.

11. The structured substrate of claim 7, wherein the array of cavities comprises an array of circular cavities.

12. The structured substrate of claim 7, wherein in a cross sectional view along the first major axis, a first surface area is defined as the region of the first major surface comprising a protrusion and the cavity for which the protrusion forms one wall, a second surface area is defined as the region of the second major surface comprising a protrusion and the cavity for which the protrusion forms one wall, and a third surface area is defined as the land area between the first surface area and the second surface area, and wherein the ratio of the sum of the first surface area and the second surface area to the third surface area is 1:1 or greater.

13. The structured substrate of claim 1 being made by extrusion replication.

14. The structured substrate of claim 1, wherein the structured substrate comprises a uniform material composition.

* * * * *